UNITED STATES PATENT OFFICE.

OTTO RÖHM, OF ESSLINGEN, GERMANY.

PREPARATION OF HIDES FOR THE MANUFACTURE OF LEATHER.

No. 886,411.     Specification of Letters Patent.     Patented May 5, 1908.

Application filed October 12, 1907. Serial No. 397,149.

*To all whom it may concern:*

Be it known that I, OTTO RÖHM, a subject of the German Emperor, residing at Esslingen, Germany, have invented a certain new and useful Improvement in the Preparation of Hides for the Manufacture of Leather, of which the following is a specification.

For bating hides, that is to say, for removing the lime and fatty matter from the hides after the liming process, dog manure has been used for a long time.

The present invention has for its object, to provide a simpler and more reliable method of removing the lime, together with the fatty matter and the remnant of the hairs. For this purpose I treat the hides with an aqueous extract from the pancreas of animals. The principal constituent of the said pancreatic extract is trypsin, the effect of which is materially assisted by the other enzyme of the pancreas, viz. steapsin, which has the property of splitting up fat and completing the saponification of the fat contained in the hides.

Aqueous pancreatic extracts alone have a very efficient bating action, but it is advantageous to add salts of ammonia or of alkalies or mixtures of such salts. The favorable effect of these salts on hides becomes apparent chiefly by the fact, that the hides shrink, become thinner and are less liable to become rough, on being placed in pure water after the bating process, which defect is liable to occur, when the hides have a strong alkaline reaction and the water contains a considerable quantity of calcium-bicarbonate.

The details of procedure will appear from the following example: A pancreas weighing about 250 grams is extracted with 1 liter of water, and 10 cubic centimeters of this extract are added to 990 cubic centimeters of a 0.1 per cent. aqueous solution of ammonium chlorid. The solution thus obtained is an excellent bate.

When the hides, which have been limed and have an alkaline reaction, are introduced into the bating liquid, the hides are liable to become rough, through the precipitation of calcium carbonate, in case the water employed contains much calcium-bicarbonate in solution. This defect may occur, whether the bating liquid contains trypsin alone, or together with salts of ammonia or alkali, and it may be avoided by subjecting the water intended for the preparation of the bate, to a preliminary treatment, which consists in precipitating the carbonic acid by means of a suitable quantity of lime water, or in adding to the bating liquid before the introduction of the hides starch-paste or other organic or inorganic materials adapted to envelop the calcium carbonate.

If desired, both remedies, viz. lime water and starch-paste, may be used at the same time.

What I claim is:—

1. The process for bating hides, which consists in treating the hides with an aqueous extract of the pancreas of animals, substantially as described.

2. The process for bating hides, which consists in treating the hides with an aqueous pancreatic extract containing an ammonia-salt, substantially as described.

3. The process for bating hides, which consists in treating the hides with an aqueous pancreatic extract containing a mixture of salts of alkali and ammonia, substantially as described.

In witness whereof I have set my hand hereunto in the presence of two subscribing witnesses.

OTTO RÖHM.

Witnesses:
  H. STRÄHLE,
  OTTO HAAS.